US007711765B2

(12) United States Patent
Wang et al.

(10) Patent No.: US 7,711,765 B2
(45) Date of Patent: May 4, 2010

(54) METHOD AND APPARATUS TO PERFORM MULTIPLY-AND-ACCUMULATE OPERATIONS

(75) Inventors: Yi-Pin Eric Wang, Cary, NC (US);
Gregory E. Bottomley, Cary, NC (US);
Andres Reial, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1113 days.

(21) Appl. No.: 11/357,816

(22) Filed: Feb. 17, 2006

(65) Prior Publication Data

US 2007/0244953 A1    Oct. 18, 2007

(51) Int. Cl.
*G06F 15/00*    (2006.01)
(52) U.S. Cl. .................................... 708/603
(58) Field of Classification Search .................. 708/603
See application file for complete search history.

(56) References Cited

U.S. PATENT DOCUMENTS

| | | | | |
|---|---|---|---|---|
| 5,282,150 | A | * | 1/1994 | Yamada ...................... 708/200 |
| 5,880,981 | A | | 3/1999 | Kojima et al. |
| 6,141,334 | A | | 10/2000 | Flanagan et al. |
| 6,397,240 | B1 | | 5/2002 | Fernando et al. |
| 6,574,269 | B1 | | 6/2003 | Bergamo |
| 6,674,820 | B1 | | 1/2004 | Hui et al. |
| 6,771,690 | B2 | | 8/2004 | Heikkila |

FOREIGN PATENT DOCUMENTS

| EP | 0 513 595 | 11/1992 |
|---|---|---|
| WO | WO 94/15278 | 7/1994 |
| WO | WO/ 044141 | 7/2000 |

OTHER PUBLICATIONS

Peng, H. et. al., "Linear Interference Cancellation in CDMA Based on Iterative Techniques for Linear Equation Systems." IEEE Transactions on Communications, Dec. 12, 2000, 2099-2108, vol. 48, No. 12.

Ma, Y. and Lim, T., "Linear and Nonlinear Chip-Rate Minimum Mean-Squared-Error Multiuser CDMA Detection". IEEE Transactions On Communications, Mar. 2001, pp. 530-542, vol. 49, No. 3.

Sim, H.K. and Cruickshank, D.G.M., "A Sub-Optimum MLSE Detector With A Folded State-Transition Trellis Preselection Stage". 3G Mobile Communication Technologies, Conference Publication No. 471. IEEE, 2000. 271-275.

(Continued)

*Primary Examiner*—Tan V Mai
(74) *Attorney, Agent, or Firm*—Coats & Bennett, P.L.L.C.

(57) ABSTRACT

A method and corresponding circuit for determining a final result for a desired series of multiply-and-accumulate (MAC) operations are based on counting the occurrence of products in the desired series of MAC operations, multiplying the counts by their corresponding products to obtain partial sums, and adding the partial sums to obtain the final result. MAC processing as taught herein can be applied to a wide range of applications, such as received signal processing in wireless communication for computationally efficient (and high-rate) generation of interference correlation estimates and/or equalization filter values for a received communication signal.

32 Claims, 5 Drawing Sheets

OTHER PUBLICATIONS

Chen, D., "A New Method to Reduce the Complexity of Joint Detection Algorithm". Globecom 2003, IEEE, 2003 2335-2339.

Bottomley, G. et. al., "A Generalized RAKE Receiver for Interference Suppression." IEEE Journal Select Areas of Communication, Aug. 2000, pp. 1536-1545.

Mahram, Hadinejad, H., "On the Equivalence of Linear MMSE Chip-Level Equalizer and Generalized RAKE." IEEE Communication Letter, Jan. 2004, pp. 7-8, vol. 8.

Hai, W. et. al., "Approaches for Fast, Adaptive, Generalized Rake Reception". Research Disclosure Journal, Kenneth Mason Publications Ltd., Nov. 2003. 3 pages.

Hasegawa, T. and Shimizu, M., "A Chip Correlation MMSE Receiver With Mulitpath Interference Correlative Timing For DS-CDMA Systems." Proc. IEEE Vehicle Technology Conference (VTC). May 30-Jun. 1, 2005. Stockholm, Sweden.

* cited by examiner

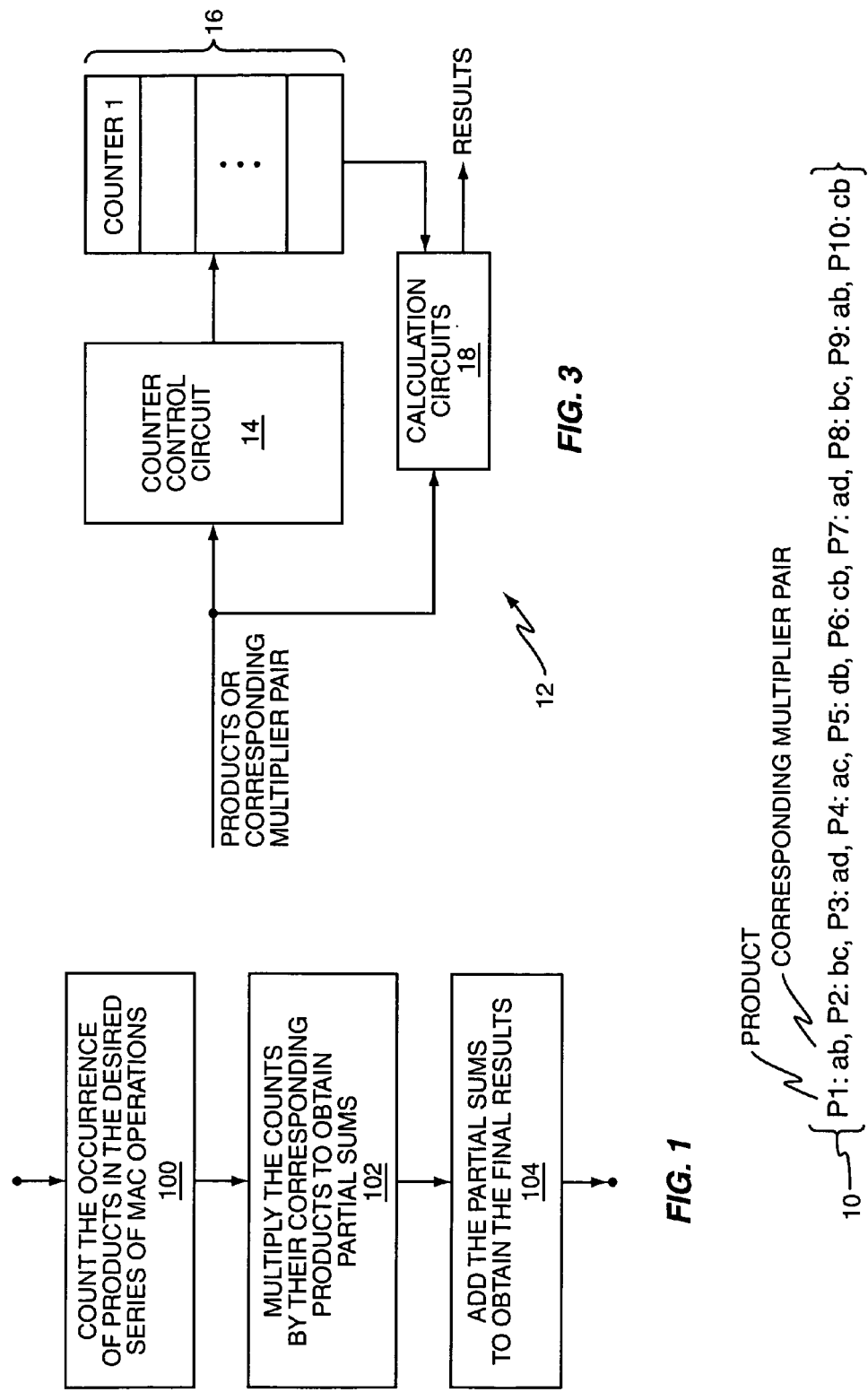

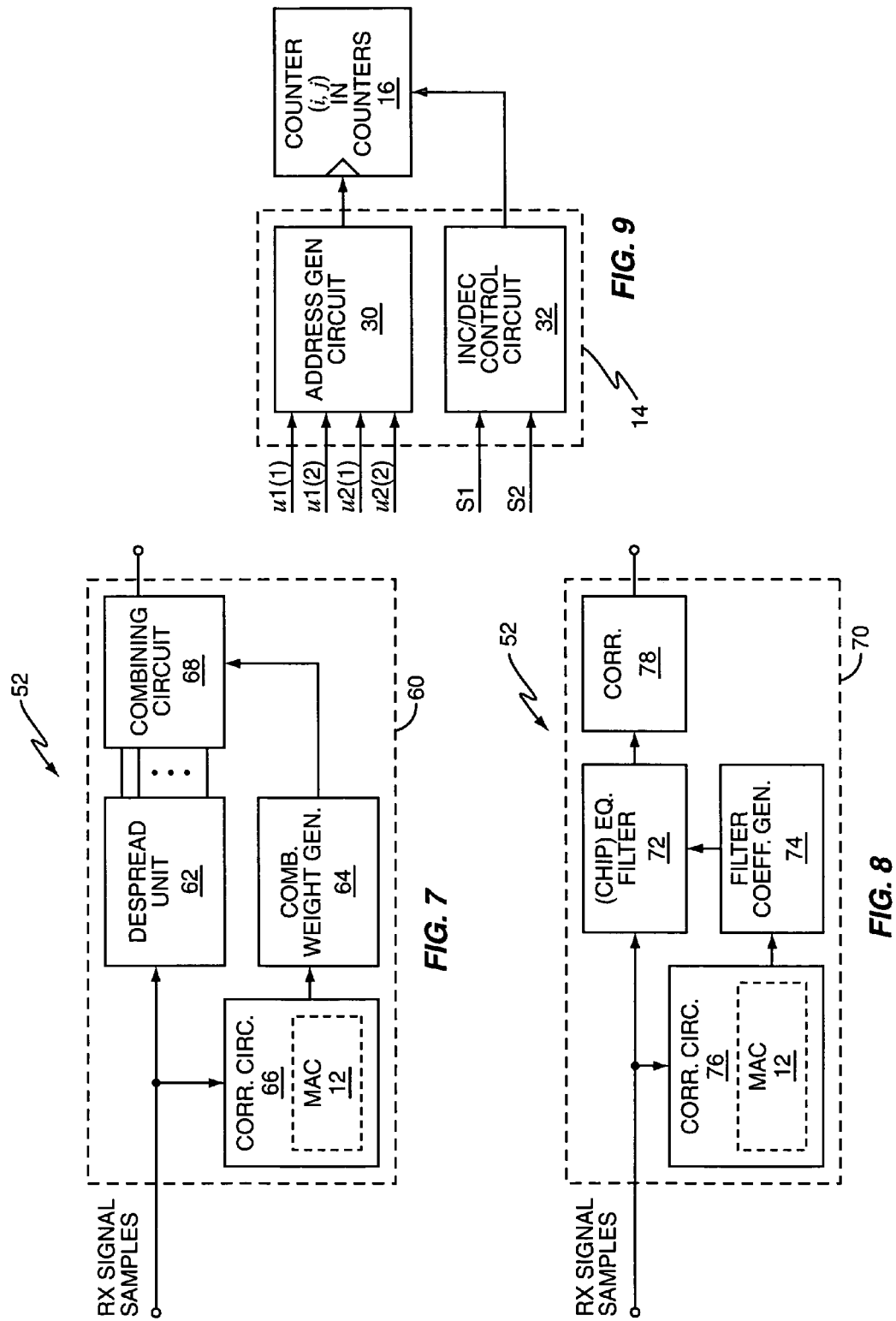

|  | 1 | 3 | 5 | 7 |
|---|---|---|---|---|
| 1 | 1 | 3 | 5 | 7 |
| 3 | 3 | 9 | 15 | 21 |
| 5 | 5 | 15 | 25 | 35 |
| 7 | 7 | 21 | 35 | 49 |

FIG. 10

| u1 / u2 | 1 | 3 | 5 | 7 |
|---|---|---|---|---|
| 1 | 2 | 10 | 26 | 50 |
| 3 | 10 | 18 | 34 | 58 |
| 5 | 26 | 34 | 50 | 74 |
| 7 | 50 | 58 | 74 | 98 |

FIG. 11

METHOD AND APPARATUS TO PERFORM MULTIPLY-AND-ACCUMULATE OPERATIONS

BACKGROUND

The present invention relates generally to numeric processing, such as used in communication signal processing contexts, and particularly relates to multiply-and-accumulate operations.

A multiply-and-accumulate (MAC) operation multiplies two numbers and adds the result to a saved value or, more generally, to an accumulation register. Useful results, such as signal filtering in the digital domain, are obtained by repeating this operation for a series of number pairs.

A conventional approach to performing a desired series of MAC operations requires performing a full precision multiply operation and a full precision addition operation for each number pair in the series. The implementation of conventional MAC operations in software may result in undesirable performance penalties. Performance can be significantly improved by providing dedicated MAC hardware in the form of appropriately interconnected adders/multipliers and control logic. However, performing MAC operations at high rates, such as those associated with digital signal processing in the wireless communication domain, requires very high-speed adders and multipliers. Such hardware may be impractical, at least for some integrated circuit processes, or may be prohibitively expensive or power hungry.

SUMMARY

In one embodiment, a method for carrying out a desired series of multiply-and-accumulate (MAC) operations comprises counting the occurrence of particular products in the set of products corresponding to the desired series of MAC operations, generating partial sums by multiplying the counts by their corresponding products, and adding the partial sums to obtain a final result for the desired series of MAC operations. As the desired series of MAC operations represents the summation of a series of individual multiplications, with each multiplication involving a multiplier pair, counting products in one embodiment comprises carrying out multiplications of the multiplier pairs and counting the occurrence of products resulting from those multiplications. In another embodiment, counting products comprises counting the occurrence of multiplier pairs corresponding to the products, i.e., the count is obtained without the necessity of carrying out the multiplication of the product pairs.

In either case, the counting can be performed by incrementing a corresponding counter for positive occurrences of a given product, and decrementing that counter for negative occurrences of the product. Negative and positive occurrences can be determined based on the signs of the individual multipliers giving rise to the product. Thus, one embodiment of a MAC circuit comprises one or more processing circuits configured to count the occurrence of products in a desired series of MAC operations, multiply the counts by their corresponding products to obtain partial sums, and add the partial sums to obtain the final result. In one or more embodiments of the MAC circuit, the processing circuit(s) include counters and addressing control circuits. The addressing and control circuits address the counters as a function of the products being counted. For example, the addressing and control circuits can be configured to map each unique product magnitude to a given counter, such that the counter is decremented for negative occurrences of the product and incremented for positive occurrences.

For embodiments that count the occurrence of products based on counting the multiplier pairs corresponding to those products, the addressing and control circuits can be configured to map multiplier pairs to corresponding counters. For example, one embodiment of a MAC circuit as taught herein includes a counter for each unique multiplier pair. However, to save counters, the addressing and control circuits are, in another embodiment, configured to map "equivalent" multiplier pairs to the same counter. In one embodiment, multiplier pairs are considered equivalent if they correspond to the same product magnitude. In another embodiment, as an addition to considering equivalence based on product magnitudes, or as an alternative to such consideration, multiplier pairs may be considered equivalent if they comprise the same multipliers, e.g., $a \times b$ equals $b \times a$ (regardless of the signs involved).

The various circuit and method embodiments taught herein have broad applicability. For example, in one embodiment, a wireless communication device includes a MAC circuit as taught herein, and is configured to calculate interference correlations for received signal processing at least in part using that MAC circuit. In another embodiment, the wireless communication device is configured to use a MAC circuit as taught herein for the calculation of chip equalization filter values. In another embodiment, the wireless communication device includes a Generalized RAKE receiver circuit, wherein the desired series of MAC operations comprise at least part of a correlation estimation process for a received signal, such as may be used for combining weight generation in Generalized RAKE receivers. By way of further non-limiting examples, a desired series of MAC operations as taught herein can be performed in a sample correlation estimation process, a signal convolution process, a signal correlation process, or a Finite Impulse Response filtering process.

Of course, the present invention is not limited to the above features and advantages. Indeed, those skilled in the art will recognize additional features and advantages upon reading the following description and upon viewing the accompanying drawings.

BRIEF DESCRIPTION OF DRAWINGS

FIG. 1 is a logic flow diagram of processing logic for one embodiment of multiply-and-accumulate (MAC) processing.

FIG. 2 is table of hypothetical products and their corresponding multiplier pairs, such as may be processed according to the MAC processing method of FIG. 1.

FIG. 3 is a block diagram of circuit elements for one embodiment of a MAC circuit configured for MAC processing.

FIG. 7 is a block diagram for a Generalized RAKE embodiment of a receiver circuit included in the wireless communication device of FIG. 6, wherein MAC processing as taught herein is used to obtain interference correlation estimates for combining weights generation.

FIG. 8 is a block diagram for a Chip Equalization (CE) embodiment of a receiver circuit included in the wireless communication device of FIG. 6, wherein MAC processing as taught herein is used to obtain filter tap coefficients for CE filtering.

FIG. 9 is a block diagram of MAC circuit details for one embodiment of MAC processing.

FIGS. 10 and 11 are tables illustrating multiplier-to-counter mapping tables as may be implemented by MAC processing logic, as taught herein.

DETAILED DESCRIPTION

Figure 4:
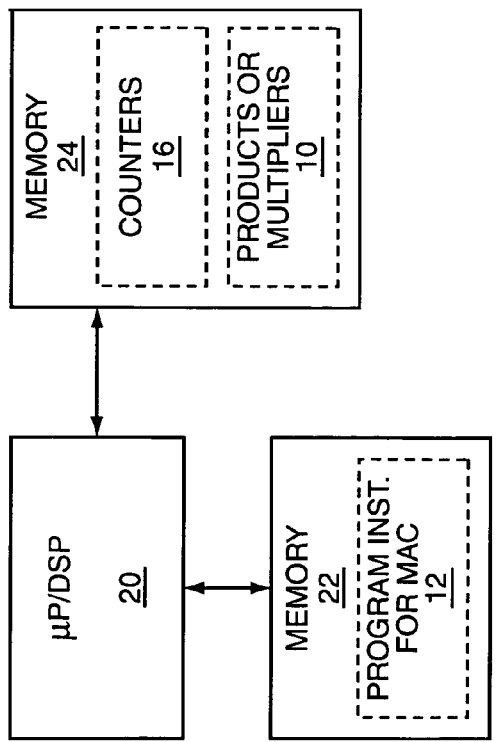
FIG. 4 is a block diagram of a microprocessor-based circuit, which may be used to implement a MAC circuit.

FIG. 1 is a logic flow diagram illustrating one embodiment of processing logic for carrying out a desired series of multiply-and-accumulate (MAC) operations, and which may be implemented in hardware, software, or any combination thereof. As a means for better understanding the illustrated method, FIG. 2 illustrates a set of products 10 representing the product terms involved in a given series of MAC operations. One sees that each of the products (P1 through P10) correspond to multiplier pairs. For example, multipliers a and b give rise to product P1, multipliers b and c give rise to product P2, and so on.

An inspection of set 10 reveals that some products in the set occur more than once. For example, ignoring any sign differences for the moment, product P1 is the same as product P9. Moreover, if the ordering of the individual multipliers comprising the multiplier pairs corresponding to the products is not important for the given application, the product of multipliers b and c occurs four times in the set of products 10, i.e., P2, P6, P8, and P10. The repetition of products may be significant, particularly over a long series of multiplier pairs. More particularly, where the underlying range of values taken on by the individual multipliers is limited, e.g., the multipliers correspond to low-resolution digital samples, the number of repeated multiplier pairs/products over a long sample series can be significant.

With that point in mind, and returning to the logic of FIG. 1, processing to determine a final result for a desired series of MAC operations "begins" with counting the occurrence of products in the desired series of MAC operations (Step 100). Processing continues with multiplying the counts by their corresponding products to obtain partial sums (Step 102), and adding the partial sums to obtain the final result (Step 104). Thus, whether for real-valued or complex samples, and whether for multiplier pairs or more complex product terms, the MAC circuits and methods taught herein provide a basis for performing a desired series of MAC operations using a number of simple counters—e.g., up/down counters—and simple post-counting operations to evaluate the desired series.

In one or more embodiments, such processing is based on splitting a signed number into two parts, a sign bit and a magnitude. In such embodiments, each counter is associated with the product of two magnitudes. Counters are specifically addressed by the two magnitudes forming the product. If a counter is addressed, it is counted up by 1 when the product of the sign bits—sign bits are represented by +1 or −1—is positive, which herein is referred to as a positive occurrence, and down by 1 if the product of the sign bits is negative, which herein is referred to as a negative occurrence. In this way, the value in a counter represents the accumulated multiplier for the associated magnitude pair. For example, if the desired series of MAC operation is 2·3+(−2·3)+(−2·−3)+2·3+(−2·−3)+(−2·3), one or more embodiments of the MAC processing method taught herein calculate that desired series as (1−1+1+1+1−1)(2·3)=2.6.

The up/down counting calculates (1−1+1+1+1−1)=2 in the above manipulation. The final results for the desired series of MAC operations are calculated by multiplying the "count" of the up-down counter (2, according to the above example) and the product of the two magnitudes associated with the counter (6, according to the above example) as illustrated in the final equation above.

Note, too, that in one or more embodiments, positive occurrences of a given product may be accumulated in one counter, and negative occurrences of that same product may be accumulated in another counter. Then, the multiplier for that product is determined by subtracting the accumulated negative occurrence counts from the accumulated positive occurrence counts. Alternatively, a negative partial sum and a positive partial sum can be formed prior to accumulation. Such an embodiment can be implemented where it is desirable to use unidirectional, e.g., up, counters, rather than up/down counters. The accumulated count values as multiplied by their corresponding products yield partial sums, which can then be added together to obtain the final result of the desired series of MAC operations. If all numbers are positive (unsigned), then only an up counter is needed, and operations involving sign bits can be eliminated.

MAC processing as taught herein can be applied to any desired series of MAC operations. In general, a desired series of MAC operations may be represented as $$z = \sum_{i=0}^{N-1} x(i)y(i) \quad \text{Eq. (1)}$$

The magnitudes of $x(i)$ and $y(i)$ can be used to address up-down counters, and the product of the sign bits of $x(i)$ and $y(i)$ is used to determine whether the addressed counter should be incremented or decremented. Where the multipliers $x(i)$ and $y(i)$ take on a finite range of values, the number of possible products is also finite, and the methods taught herein exploit the repetition of product magnitudes that arise in a given series of MAC operations.

In general, $x(i)$ and $y(i)$ do not need to be real numbers, thus the methods taught herein have broad application to a wide range of signal processing applications, such as communication signal processing. For example, the correlation of two number sequences takes the form of Eq. (1). Thus, the proposed methods can be applied to correlation calculations, which are prevalent in a wide range of communication signal processing functions.

For example, in code division multiple access (CDMA) systems, a receiver often needs to compute correlations between complex-valued received samples and a complex-valued spreading sequence, which is referred to as despreading. The despreading operation can be done using the methods proposed herein. In wideband CDMA (WCDMA) and cdma2000, the spreading sequence takes on values {a, b, −a, −b}, where a=1+j and b=1−j. Assume the received samples take on the complex values of {c, d, e, f, −c, −d, −e, −f}. The up-down counters associated with (a,c), (a,d), (a,e), (a,f), (b,c), (b,d), (b,e), (b,f), respectively, can be used to tally the multiplier associated with each pair during correlation. The final correlation can be obtained by $$z = c_{ac}(a \cdot c) + c_{ad}(a \cdot d) + c_{ae}(a \cdot e) + c_{af}(a \cdot f) + c_{bc}(b \cdot c) + c_{bd}(b \cdot d) + c_{be}(b \cdot e) + c_{bf}(b \cdot f) \quad \text{Eq. (2)}$$

where $c_{ij}$ are the values of the counter associated with (i, j).

As a further example, finite-impulse-response (FIR) filtering is also a MAC operation, and can be represented as, $$z(n) = \sum_{i=0}^{N-1} x(i)y(n-i) \qquad \text{Eq. (3)}$$

Thus, x(i) can represent the coefficients of the FIR filter and y(i) can represent the signal samples input to the filter. As such, the methods taught herein apply directly to FIR filtering. Furthermore, convolution between signals x(i) and y(i) is of the form of Eq. (3), and the methods taught herein thus apply directly to the convolution of two signals.

With these and other applications in mind, FIG. 3 illustrates one embodiment of a MAC circuit 12 that can be configured to carry out the method of performing MAC operations taught herein. The illustrated MAC circuit 12 comprises a counter control circuit 14 that is configured to control a plurality of counters 16 included in, or associated with, the MAC circuit 12, and one or more calculation circuits 18. The calculation circuits 18 are configured to obtain the partial sums based on the product occurrence counts that accumulate in the counters 16 as a function of the counter control circuit 14 processing the products corresponding to the desired series of MAC operations, and to generate the final results by adding the partial sums together.

It should be understood that the circuit elements depicted in FIG. 3 may comprise hardware-based circuits, software-based circuits, or any combination thereof. For example, FIG. 4 illustrates a microprocessor (or DSP) 20 that includes or is associated with program memory 22 storing computer program instructions embodying the MAC circuit 12, and that is further associated with data memory 24 providing registers for implementing the counters 16 and storing the set of products 10 (or the corresponding multiplier pairs). (Note, too, that, the products or multipliers do not need to be pre-stored and can be processed on an as-generated basis for a given series of MAC operations being performed in real time or near real time. Further, note that rather than a microprocessor, an ASIC, FPGA, or other programmable logic device may be used to implement the MAC circuit 12.)

Regardless of its implementation details, in one embodiment the MAC circuit 12 counts the occurrence of products in the desired series of MAC operations by carrying out multiply operations for the multiplier pairs corresponding to the products, and counting positive and negative occurrences of each product. (Alternatively, an associated circuit may perform the multiplier pair multiplications to obtain the products and provide them to the MAC circuit 12 for counting.) Further, the product values may be rounded or quantized to limit the number of possible product values, hence reducing the number of counters needed. In one embodiment, counting positive and negative occurrences of each product comprises using product magnitudes to address corresponding ones of the counters 16, incrementing the corresponding counter for each positive occurrence of a given product, and decrementing the corresponding counter for each negative occurrence. With this approach, multiplying the counts by their corresponding products to obtain partial sums comprises multiplying the count stored in each counter by the corresponding product.

Counting product occurrences by carrying out the multiplication of multiplier pairs in the desired series of MAC operations represents a significant computational advantage compared to a conventional, direct approach to MAC operations, wherein each multiplier pair is multiplied and the resulting product added to a MAC accumulator. For example, to perform a series of 100 MAC operations, a conventional (direct) MAC circuit would perform 100 full-precision multiplications and 100 full-precision additions, including carry/overflow tracking. However, one embodiment of the MAC circuit 12 would simply count the occurrence of same-valued products as it carried out the 100 multiplications, use the accumulated counts to multiply the corresponding same-valued products, and then add together those results to obtain the final results. If the 100 products included only fifteen unique values, then only fifteen additions would be needed, rather than the 100 additions conventionally required. The product of the corresponding multiplier pair can be determined using, for example, a look-up table, or other data structure, holding predetermined product values. More generally, the products for at least some of the multiplier pairs corresponding to products in a desired series of MAC operations can be stored in memory as pre-computed values.

In one or more other embodiments, the MAC circuit 12 and the corresponding method obtain even greater computational efficiency by counting the occurrence of products in the desired series of MAC operations based on counting the occurrence of multiplier pairs corresponding to the products. In such embodiments, product counts are obtained without need for first carrying out the multiplication of the multiplier pairs. Again, pre-computed values can be stored for products of the various multiplier pairs, such that product values for the multiplier pairs can be determined using a look-up function, rather than by carrying out the multiplication. A memory including look-up data thus may be included in the MAC circuit 12, or may be directly or indirectly associated with the MAC circuit 12. The multiplier pair values may be further quantized to reduce the number of counters needed.

Among other advantages, the gains in computational efficiency offered by MAC processing as taught herein may allow significant reductions in power consumption. For example, power savings may be realized because the MAC circuit 12 is relatively simple in functional terms, and because the number of operations required to compute results for a desired series of MAC operations may be reduced using the methods taught herein. Further, MAC processing as taught herein may make high-speed MAC processing more feasible. For example, it may be difficult to perform multiplications at, for example, 160 MIPS, but it may be much easier to perform counting-based MAC operations as taught herein at a similar rate.

Figure 5:
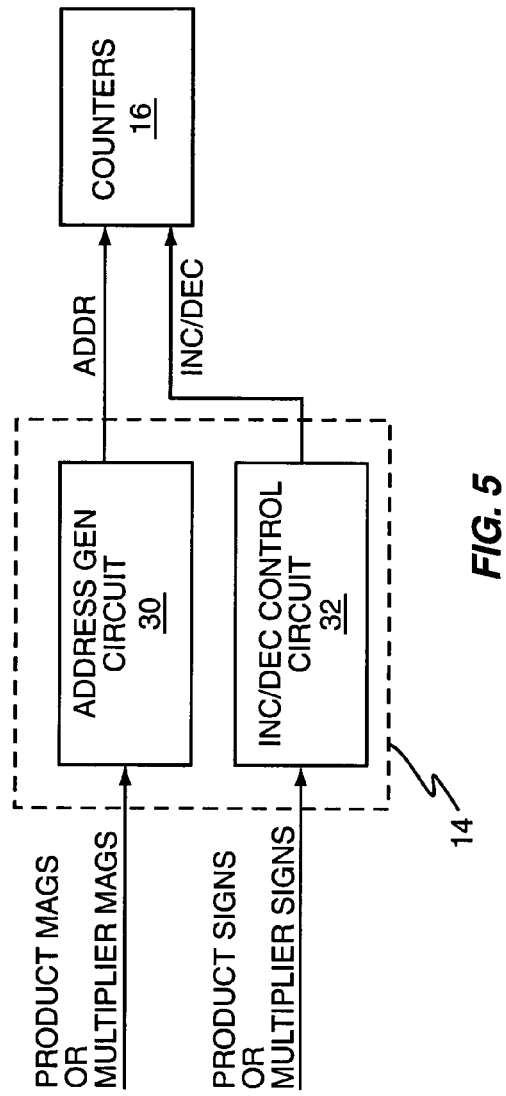
FIG. 5 is a block diagram of MAC circuit details for one embodiment of MAC processing.

To better illustrate one or more embodiments of product counting, FIG. 5 depicts the counter control circuit 14 of the MAC circuit 12 as comprising an address generation circuit 30 and an increment/decrement control circuit 32, which are associated with counters 16. For example, in one embodiment, the one or more processing circuits comprising the MAC circuit 12 are configured to generate counter addresses as a function of product magnitudes, and to control counter incrementing and decrementing as a function of product signs, such that a corresponding counter in a plurality of counters is incremented or decremented for each occurrence of a given product. In one or more embodiments, counters and pre-processing functions, such as identifying multiplier signs, etc., for the desired series of MAC operations, may be included within the one or more processing circuits comprising the MAC circuit 12.

Regardless, the product magnitudes may be input to the address generation circuit 30, which can be configured to generate a corresponding counter address as a function of each unique product. Further, the corresponding product signs may be input to the increment/decrement control circuit 32. With this arrangement, each unique product in the series is mapped to a particular one of the counters 16. Thus, each occurrence of a unique product in the series causes the corresponding counter to be incremented if the occurrence is positive, or decremented if the occurrence is negative. Occurrences are individually determined to be positive or negative by the sign value(s) input to the increment/decrement control circuit 32 in conjunction with the occurrence being counted.

In another embodiment, the MAC circuit 12 counts products in the desired series of MAC operations by processing the multiplier pairs corresponding to the products based on addressing a corresponding counter for each occurrence of a given multiplier pair, incrementing the corresponding counter if the occurrence is positive, and decrementing the corresponding counter if the occurrence is negative. Thus, the address generation circuit 30 may be configured to generate a counter address for each occurrence of a given multiplier pair by determining the counter address based on magnitudes of individual multipliers comprising the given multiplier pair. That is, the multiplier pairs, or their corresponding magnitudes, may be input to the address generation circuit 30 in conjunction with inputting the multiplier pairs or their corresponding sign values into the increment/decrement control circuit 32.

In one embodiment, the address generation circuit 30 generates a unique counter address for each unique multiplier pair. For example, using real numbers by way of non-limiting example, the address generation circuit 30 can be configured to generate a different counter address for the multiplier pairs (a·b) and (b·a), although their corresponding product magnitudes are the same. One advantage to mapping every unique multiplier pair to a different counter address is simplification of the address generation logic. Such simplification may be desirable for very high-rate signal processing applications.

While such mapping may result in simplified counter address generation, it does require, in general, a greater number of counters in the plurality of counters 16. Because the counters 16 can be implemented using addressable memory registers, there may be an abundance of counter resources available. On the other hand, if counter resources are a concern and/or circuit performance is not an issue, the address generation circuit 30 can be configured to map "equivalent" multiplier pairs to the same counter address. An equivalent multiplier pair is defined in one embodiment as multiplier pairs whose individual multipliers have the same magnitudes. For example, the multiplier pair (3, 2) would be equivalent to (2, 3). Additionally, or alternatively, the definition of equivalent multiplier pairs may be extended to include multiplier pairs corresponding to the same product magnitude. Thus, (3, 2), (2, 3), (1, 6), and (6, 1), all would be equivalent and the occurrence of any one of these products would generate the same counter address.

The choices of whether to count actual products or to count corresponding multiplier pairs, and whether to favor simplified counter address generation over a greater number of counters depends at least to some extent on the particular application at hand. For example, the MAC circuit 12 and the corresponding method of carrying out MAC operations may be applied in communication signal processing applications, as noted earlier herein On that point, in commercial CDMA systems (e.g., WCDMA and cdma2000 wireless communication networks), performance is often limited by multiple-access interference. At least a portion of the multiple access interference can be modeled as colored noise. In the downlink from the base stations to the access terminals, colored noise arises from a few base station signals received through dispersive channels. Each base station signal is colored by frequency-selective fading. Similarly, in the uplink, the high-power, high-data-rate signals received from the access terminals through dispersive channels gives rise to colored interference at the base station receiver.

In either the base station receivers or the access terminal receivers, when colored noise dominates, receiver performance can be significantly improved by exploiting interference correlation to suppress interference. Because the determination of interference correlation estimates generally involves performing potentially many MAC operations, interference correlation determination can be computationally simplified by carrying out at least some of the desired MAC operations using the circuits and methods taught herein. Note that interference correlation includes data or chip sample correlation.

Figure 6:
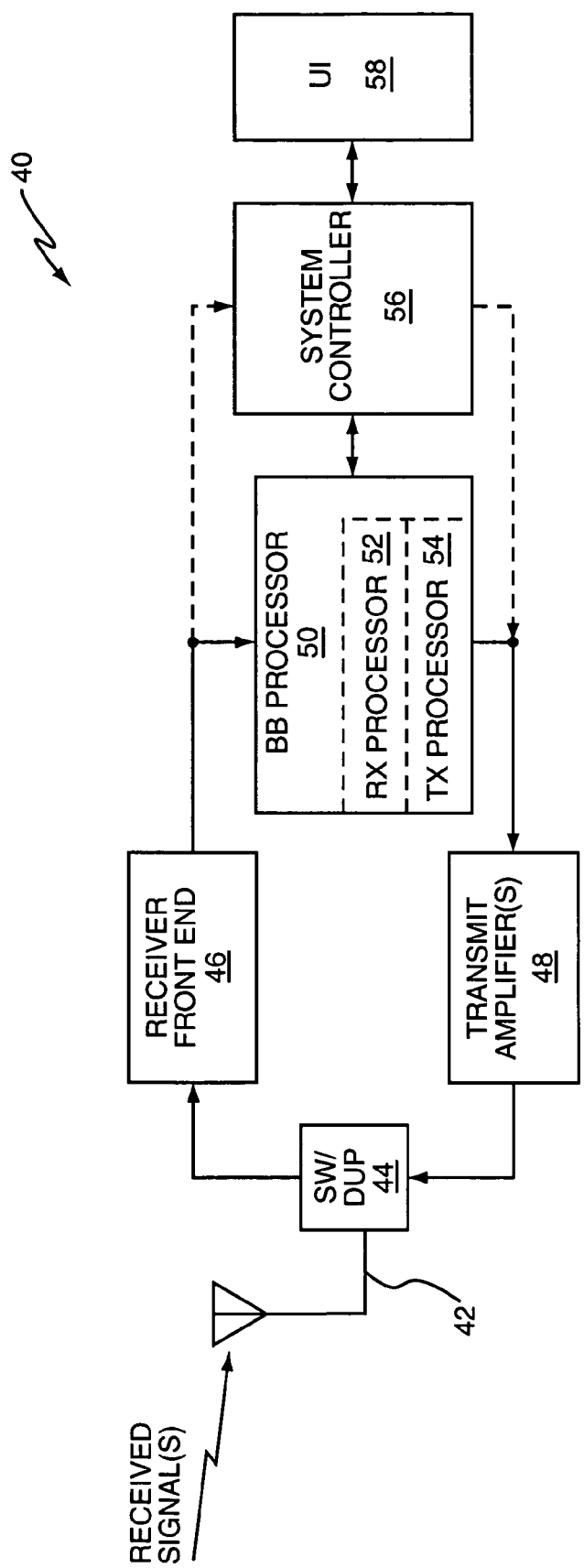
FIG. 6 is a block diagram of a wireless communication device, which is configured for MAC processing.

For example, FIG. 6 illustrates a wireless communication device 40 that is configured to implement MAC processing as taught herein. In the illustrated embodiment, the wireless communication device 40 comprises a receive/transmit antenna 42, a switch/duplexer 44, a receiver front-end 46, a transmit amplifier circuit 48, a baseband processor circuit 50, including a receive processor 52 and a transmit processor 54, a system controller 56, and a user interface 58. Of course, those skilled in the art will appreciate that the wireless communication device 40 may deviate from the depicted circuit arrangement according to its intended use. For example, the wireless communication device 40 may comprise a mobile radiotelephone (e.g., a cellular handset), a Portable Digital Assistant (PDA) with wireless communications, a wireless pager, a palmtop/laptop computer or a network card therein, etc.

In one embodiment, shown in FIG. 7, the receive processor 52 includes a Generalized RAKE (G-RAKE) receiver 60, comprising a despread unit 62, a combining weight generator 64, an interference correlation circuit 66, which includes an embodiment of the MAC circuit 12, and a combining circuit 68. In operation, the interference correlation circuit 66 implements an interference correlation estimation process, which yields interference correlation estimates for the received data samples, for use in combining weight generation as carried out by the combining weight generator 64. To the extent that the interference correlation estimates accurately represent colored interference correlations, application of the generated combining weights to the despread signals output by the despread unit 62 results in colored interference cancellation in the combined signal output by the combining circuit 68.

Notably, the interference correlation circuit 66 performs interference correlation estimation at least in part using its included MAC circuit 12, although it may include or have access to conventional MAC circuits, as well. As such, the computational efficiency, processing speed, and/or power consumption characteristics are improved for the interference correlation estimation process carried out by the receive processor 52. (It should be understood that the receive processor 52 may be implemented within a microprocessor, ASIC, FPGA, or other processing circuit.)

Further, those skilled in the art will appreciate that G-RAKE processing is equivalent to linear minimum mean square error (LMMSE) based chip equalization (CE). To that end, FIG. 8 depicts another embodiment of the receive processor 52, wherein it includes a chip equalization circuit 70 comprising a (chip) equalization filter 72, a filter coefficient generator 74, a data correlation circuit 76, which includes an embodiment of the MAC circuit 12, and a despreading correlator 78.

In operation, the equalization filter 72 equalizes the received signal samples based on the filter coefficients generated by the filter coefficient generator 74. In turn, the filter coefficients are generated based at least in part on data correlation estimates generated by the data correlation circuit 76, which is configured to generate data sample correlations using its included MAC circuit. The equalized received signal samples are then input to the despreading correlator 78 for detection of the transmitted symbol information.

As with the interference correlation circuit 66 in FIG. 7, the data correlation circuit 76 of FIG. 8 improves the computational efficiency during its data correlation estimation process by using the MAC circuit 12 for at least a portion of the MAC operations needed for generating the interference correlation estimates. For linear interference-suppressing receivers in general, then, various embodiments of the MAC circuit 12 can yield significant performance and/or efficiency advantages in the estimation of interference correlations in G-RAKE implementations for combining weight generation, or in the estimation of data correlations in CE implementations for filter tap coefficients.

For G-RAKE, the combining weights can be formulated as $w_{GR}=R_u^{-1}h$, where $R_u$ is the interference correlation and h is the net response. For CE, the tap coefficients can be determined by $w_{CE}=R_d^{-1}f$, where $R_d$ is the receive samples correlation and f is the correlation between the receive samples and the chip value of interest. The weight vectors $w_{GR}$ and $w_{CE}$ are related by a positive scaling factor. That is, $w_{GR}=\lambda w_{CE}$, where $\lambda>0$. Thus, the combining weights of G-RAKE can be determined using the receive samples correlation $R_d$ matrix. As such, the efficient calculation of $R_d$ as provided by the MAC circuit 12 and corresponding method taught herein benefits not only the chip equalizers, but also G-RAKE receivers. Indeed, in the G-RAKE context, basing combining weight estimations on the chip samples, rather than on despread values, can yield improved performance under fast-fading conditions.

Thus, efficient MAC processing as taught herein offers significant benefits to communication receivers in general. Thus, while particular embodiments are illustrated herein, those skilled in the art will recognize that the methods and circuits taught herein may be implemented in both fixed and mobile receivers, e.g., base stations and/or mobile stations.

In looking at communication receiver applications in more detail, let y(i) represent the ith complex-valued receive sample and $d_1, d_2, \ldots, d_J$, be the finger (or tap) delays in the unit of samples. Receive samples correlation matrix $R_d$ can be estimated by $$R_d = \frac{1}{N}\sum_{i=0}^{N-1} y(i)y^H(i) \qquad \text{Eq. (4)}$$

where N is the smoothing factor and vector $y(i)=[y(iK+d_1), y(iK+d_2), \ldots, y(iK+d_J)]^T$. The term K is typically set to the number of samples in a chip period.

Commonly, obtaining an accurate estimate of $R_d$ requires a large smoothing factor N. The amount of computation required for Eq. (4) can be rather large for a large N. More particularly, there are J·J elements in $R_d$, and, for each element, calculation of N complex multiplications are needed. Thus, overall N·J² complex multiplications are needed. However, processing circuits can be configured to exploit the Hermitian symmetry property of $R_d$ to reduce the number of complex multiplications to roughly N·J²/2. For example, in the context of a WCDMA-based communication signal, for J=6, N=1000, and assuming $R_d$ is updated in every WCDMA slot, the computation of $R_d$ using a conventional approach to MAC operations would consume more than 160 million instructions per second (MIPS).

Using an embodiment of the MAC circuit 12 for such operations yields significant reductions in the required MIPS, which may be illustrated by using the estimation of the (1,1) and (1,2) element of $R_d$ as examples. The former case represents the diagonal elements of $R_d$, where the latter case represents the off-diagonal elements of $R_d$. Starting with the off-diagonal element $r_{1,2}$, $$r_{1,2} = \frac{1}{N}\sum_{i=0}^{N-1} y(iK+d_1)y*(iK+d_2) \qquad \text{Eq. (5)}$$

The real part or in-phase component (I) of $r_{1,2}$ can be expressed as $$r_{1,2}^I = \frac{1}{N}\sum_{i=0}^{N-1} y_I(iK+d_1)y_I(iK+d_2)+y_Q(iK+d_1)y_Q(iK+d_2) \qquad \text{Eq. (6)}$$

where $y_I(i)$ and $y_Q(i)$ are the real part and imaginary part (quadrature component (Q)) of received sample y(i), respectively. Similarly, the imaginary part of $r_{1,2}$ can be expressed as $$r_{1,2}^Q = \frac{1}{N}\sum_{i=0}^{N-1} y_Q(iK+d_1)y_I(iK+d_2)-y_I(iK+d_1)y_Q(iK+d_2) \qquad \text{Eq. (7)}$$

The use of up-down counters for the calculation of Eq. (6) and Eq. (7) yields significant gains in computational efficiency, in comparison to performing the potentially large number of conventional MAC operations that would be required for their calculation. For example, assume the real and imaginary parts of the receive sample y(i) are both quantized into 3 bits, which consists of a 1-bit sign and a 2-bit magnitude. The 3-bit quantized values represent levels −7, −5, −3, −1, 1, 3, 5, and 7. The product of two 3-bit signed integer numbers can be calculated by $(s_1s_2)(u_1u_2)$, where $s_1$ and $s_2$ are the signs and $u_1$ and $u_2$ are the 2-bit magnitudes. The product of the signs can be used to decide whether to count up or down (increment or decrement the count). One way to implement Eq. (5) is to have separate counters for the in phase component of Eq. (6) and the quadrature component of Eq. (7) with each counter being updated twice each iteration.

FIG. 9 illustrates an embodiment of the counter control circuit 14 of the MAC circuit 12 that is configured to count the occurrence of products in a desired series of MAC operations based on processing the corresponding multiplier pairs in magnitude and sign form, as described immediately above. In more detail, the address generation circuit 30 is configured to generate counter addresses (counter (i, j)) as a function of the $[u_1(1),u_1(2)]$ and $[u_2(1),u_2(2)]$ magnitudes for the multiplier pairs $(u_1,u_2)$, where $u_k(1)$ and $u_k(2)$ denote the two bits of the two-bit magnitude of $u_k$. Further, the increment/decrement control circuit 32 is configured to increment or decrement the addressed counter as a function of the multiplier pair signs $(s_1,s_2)$. FIG. 10 is a product table for the two-bit magnitudes, and illustrates a mapping between the magnitudes of the multiplier pairs and their corresponding products, that may be used for addressing counters.

Thus, the MAC circuit 12 can be configured to use the magnitude bits of multiplier pairs corresponding to the products in a desired series of MAC operations as addresses for accessing a specific counter, i.e., magnitude bits (i,j) will address counter (i,j). For example, if the two magnitudes are 3 and 5, counter (3, 5) will be addressed. The addressed counter will be counted up or down if the product of the multiplier pair sign bits is 1 or −1, respectively.

As noted earlier, the MAC circuit 12 can be configured to map each unique multiplier pair to a different counter. That approach requires sixteen counters for the multiplier pair mappings depicted in FIG. 10. However, as also noted earlier, several combinations of multiplier pairs map to the same product value. Thus, fewer counters can be used by mapping equivalent multiplier pairs to the same counter. For example, by doing so for the values given in FIG. 10, only ten counters are needed.

In any case, once all the product terms of Eq. (6) are used in addressing the counter for up-down counting, the summation of Eq. (6) can be computed by $$r^I_{1,2} = \frac{1}{N} \sum_{m=1}^{M} c(m)p(m) \qquad \text{Eq. (8)}$$

where M is the total number of counters, c(m) is the value of the mth counter, and p(m) is the product value associated with the mth counter. Continuing our example of 3-bit signed integers for the real and imaginary parts of receive samples and exploiting the symmetry of multiplications, M=10, p(1)= 1·1=1, p(2)=1·3=3, p(3)=1·5=5, p(4)=1·7=7, p(5)=3·3=9, p(6)=3·5=15, p(7)=3·7=21, p(8)=5·5=25, p(9)=5·7=35, and p(10)=7·7=49. Note that p(m) can be pre-calculated and stored.

For the diagonal elements of $R_d$, for example element (1,1), the MAC circuit 12 can use the same logic as that used for computing the off-diagonal elements of $R_d$. As the diagonal elements are purely real, calculation of Eq. (7) can be omitted. Alternatively, the MAC circuit 12 can include addressing logic that exploits the diagonal element properties. On this point, note that the diagonal elements of $R_d$, e.g., the (1,1) element, $r_{1,1}$, can be computed as $$r^I_{1,1} = \frac{1}{N} \sum_{i=0}^{N-1} y_I^2(iK + d_1) y_Q^2(iK + d_1) \qquad \text{Eq. (9)}$$

Thus, only the two magnitude bits of $y_i$ or $y_q$ are needed for addressing the corresponding counter. Once all the $y_i$ and $y_q$ are used in addressing the counter (which needs only to count "up" in this case), the summation of Eq. (9) can be computed by $$r^I_{1,1} = \frac{1}{N} \sum_{m=1}^{M'} c'(m)p'(m) \qquad \text{Eq. (10)}$$

where M' is the total number of counters used for computing the diagonal elements of $R_d$, c'(m) is the value of the m th counter, and p'(m) is the product value associated with the mth counter. Continuing our example of 3-bit signed integers for the real and imaginary parts of receive samples, M=4, p'(1)=1×1=1, p'(2)=3·3=9, p'(3)=5·5=25, and p'(4)=7·7=49. Note that p'(m) can be pre-calculated and stored.

To further ease the computation of Eq. (8), the MAC circuit 12 can be configured to use shift operations in combination with addition/subtraction operations to compute all the products of c(m)p(m). As is known, multiplication by a power of 2 can be realized using a left shift, thus c(1)p(1)=c(1); c(2)p(2)=c(2)·3=4c(2)−c(2) or 2c(2); c(3)p(3)=c(3)·5=4c(3)+c(3); c(4)p(4)=c(4)·7=8c(4)−c(4); c(5)p(5)=c(5)·9=8c(5)+c(5); c(6)p(6)=c(6)·15=16c(6)−c(6); c(7)p(7)=c(7)·21=16c(7)+4c(7)+c(7); c(8)p(8)=c(8)·25=16c(8)+8c(8)+c(8); c(9)p(9)=c(9)·35=32c(9)+4c(9)−c(9); c(10)p(10)=c(10)·49=64c(10)−16c(10)+c(10).

In one or more embodiments, the MAC circuit 12 includes hardware and/or software based logic tailored to perform these computations, and it should be understood that similar computations can be used to compute Eq. (10). Further, the smoothing factor N can be chosen as power of 2 to ease division computations. If absolute units are unimportant, the division by N can be omitted.

Of course, although the above examples used multiplier pairs to illustrate MAC processing, it should be understood that the MAC circuit 12 can be used to perform a desired series of MAC operations wherein the products arise from multiple computations. For example, in computing $r_{1,1}^1$, a table two-dimensional counter mapping table as shown in FIG. 11 can be used for the sum of the real part and imaginary part squared, $y_I^2(iK+d_1) + y_Q^2(iK+d_1)$. In this case, the counters are updated only once instead of two or four times for each sample.

Broadly, then, MAC processing as taught herein can be applied to simple product pairs of real numbers, or to complex-valued product pairs, or to a desired series of MAC operations where the products represent several multiplications, e.g., three more multipliers giving rise to the product terms. Thus, MAC processing taught herein applies to essentially any type of signal processing or other numeric computation involving a desired series of MAC operations. Where the range of possible values taken on by the products arising in the desired series of MAC operations is limited, significant gains in processing efficiencies are obtained.

Even in instances where the range of possible products is quite large, or unlimited, it may be that a subset of the overall series of MAC operations is well bounded. That is, some products may occur more frequently than others. Thus, MAC processing as taught herein, i.e., the counter-based approach to determining MAC results, can be applied to a first subset of the products in an overall set of products. The remaining subset of products can be processed using conventional (direct) MAC operations, i.e., brute force multiply-and-accumulate processing, or by carrying out equivalent lookup table processing. In this manner, at least the most commonly occurring products, i.e., those repeated most frequently for the series of MAC operations to be performed, can be processed as taught herein. The final results for each subset can then be combined to obtain final results for the overall series of MAC operations.

Thus, those skilled in the art will appreciate that the present invention is not limited by the foregoing discussion, nor by the accompany drawings. Indeed, the present invention is limited only by the following claims and their legal equivalents.

What is claimed is:

1. A method, performed in a multiply-and-accumulate circuit, of determining a final result for a desired series of multiply-and-accumulate operations, the method comprising:

counting the occurrence of products having the same magnitudes in the desired series of multiply-and-accumulate operations;

multiplying the counts by their corresponding products to obtain partial sums; and adding the partial sums to obtain the final result.

2. The method of claim 1, wherein counting the occurrence of products in the desired series of multiply-and-accumulate operations comprises obtaining the products by carrying out multiply operations for multiplier pairs corresponding to the products, and counting positive and negative occurrences of each product.

3. The method of claim 2, wherein counting positive and negative occurrences of each product comprises using product magnitudes to address corresponding counters, incrementing a corresponding counter for each positive occurrence of a given product, and decrementing a corresponding counter for each negative occurrence.

4. The method of claim 3, wherein multiplying the counts by their corresponding products to obtain partial sums comprises multiplying the count stored in each counter by the corresponding product.

5. The method of claim 1, wherein counting the occurrence of products in the desired series of multiply-and-accumulate operations comprises counting the occurrence of multiplier pairs corresponding to the products.

6. The method of claim 1, wherein counting the occurrence of products in the desired series of multi ply-and-accumulate operations comprises processing multiplier pairs corresponding to the products by:

addressing a corresponding counter for each occurrence of a given multiplier pair;

incrementing the corresponding counter if the occurrence is positive; and decrementing the corresponding counter if the occurrence is negative.

7. The method of claim 6, wherein addressing a corresponding counter for each occurrence of a given multiplier pair comprises determining a counter address based on magnitudes of individual multipliers comprising the given multiplier pair.

8. The method of claim 7, further comprising determining whether the occurrence is positive or negative based on signs of the individual multipliers comprising the given multiplier pair.

9. The method of claim 6, wherein multiplying the counts by their corresponding products to obtain partial sums comprises multiplying the count stored in each counter by the product of the corresponding multiplier pair.

10. The method of claim 1, wherein the desired series of multiply-and-accumulate operations comprises a first subset of an overall series of multiply-and-accumulate operations, and further comprising obtaining final results for the overall series of multiply-and-accumulate operations by performing a second subset of the overall series of multiply-and-accumulate operations using direct multiply-and-accumulate operations or equivalent table lookup operations.

11. The method of claim 1, wherein the desired series of multiply-and-accumulate operations comprise at least part of combining weight estimation for a wireless communication receiver that is configured to perform received signal processing using Generalized RAKE reception.

12. The method of claim 1, wherein the desired series of multiply-and-accumulate operations comprise at least part of a chip equalization filter process for a wireless communication receiver that is configured to perform received signal processing using a chip equalization filter.

13. The method of claim 1, wherein the desired series of multiply-and-accumulate operations are performed in one of a signal sample correlation estimation process, a signal convolution process, a signal correlation process, and a Finite Impulse Response filtering process.

14. The method of claim 1, further comprising obtaining at least some of the corresponding products from a look-up table that includes pre-computed products.

15. A multiply-and-accumulate circuit comprising one or more processing circuits configured to:

count the occurrence of products having the same magnitudes in a desired series of multiply-and-accumulate operations;

multiply the counts by their corresponding products to obtain partial sums; and add the partial sums to obtain the final result.

16. The multiply-and-accumulate circuit of claim 15, wherein the one or more processing circuits comprise a counter control circuit configured to generate counter addresses as a function of product magnitudes, and to control counter incrementing and decrementing as a function of product signs, such that a corresponding counter in a plurality of counters is incremented or decremented for each occurrence of a given product.

17. The multiply-and-accumulate circuit of claim 16, wherein the plurality of counters comprise part of the one or more processing circuits.

18. The multiply-and-accumulate circuit of claim 15, wherein the multiply-and-accumulate circuit is configured to count the occurrence of products by counting the occurrence of multiplier pairs corresponding to the products, and wherein the one or more processing circuits comprise a counter control circuit configured to generate counter addresses as a function of multiplier pair magnitudes, and to control counter incrementing and decrementing as a function of multiplier pair signs, such that a corresponding counter in a plurality of counters is incremented or decremented for each occurrence of a given multiplier pair.

19. The multiply-and-accumulate circuit of claim 15, wherein the multiply-and-accumulate circuit is configured to count the occurrence of products in the desired series of multiply-and-accumulate operations by obtaining the products by carrying out multiply operations for multiplier pairs corresponding to the products, and counting positive and negative occurrences of each product.

20. The multiply-and-accumulate circuit of claim 19, wherein the multiply-and-accumulate circuit is configured to count positive and negative occurrences of each product by using product magnitudes to address corresponding counters, incrementing a corresponding counter for each positive occurrence of a given product, and decrementing the corresponding counter for each negative occurrence.

21. The multiply-and-accumulate circuit of claim 20, wherein the multiply-and-accumulate circuit is configured to multiply the counts by their corresponding products to obtain partial sums by multiplying the count stored in each counter by the corresponding product.

22. The multiply-and-accumulate circuit of claim 15, wherein the multiply-and-accumulate circuit is configured to count the occurrence of products in the desired series of multiply-and-accumulate operations by counting the occurrence of multiplier pairs corresponding to the products.

23. The multiply-and-accumulate circuit of claim 15, wherein the multiply-and-accumulate circuit is configured to count the occurrence of products in the desired series of multiply-and-accumulate operations based on processing multiplier pairs corresponding to the products by:

addressing a corresponding counter for each occurrence of a given multiplier pair;
incrementing the corresponding counter if the occurrence is positive; and
decrementing the corresponding counter if the occurrence is negative.

24. The multiply-and-accumulate circuit of claim 23, wherein the multiply-and-accumulate circuit is configured to address the corresponding counter for each occurrence of a given multiplier pair by determining a counter address based on magnitudes of individual multipliers comprising the given multiplier pair.

25. The multiply-and-accumulate circuit of claim 24, wherein the multiply-and-accumulate circuit is configured to determine whether the occurrence is positive or negative based on signs of the individual multipliers comprising the given multiplier pair.

26. The multiply-and-accumulate circuit of claim 24, wherein the multiply-and-accumulate circuit is configured to multiply the counts by their corresponding products to obtain partial sums by multiplying the count stored in each counter by the product of the corresponding multiplier pair.

27. The multiply-and-accumulate circuit of claim 15, wherein the desired series of multiply-and-accumulate operations comprises a first subset of an overall series of multiply-and-accumulate operations, and further comprising an additional multiply-and-accumulate circuit that is configured to obtain final results for the overall series of multiply-and-accumulate operations by performing a second subset of the overall series of multiply-and-accumulate operations using direct multiply-and-accumulate operations or equivalent table lookup operations.

28. The multiply-and-accumulate circuit of claim 15, wherein the multiply-and-accumulate circuit comprises part of a wireless communication device that includes a Generalized RAKE receiver circuit configured to carry out an interference correlation estimation process as part of combining weight generation, and wherein the multiply-and-accumulate circuit comprises part of the Generalized RAKE receiver and is configured to perform the desired series of multiply-and-accumulate operations as part of generating interference correlation matrices for generating the combining weights.

29. The multiply-and-accumulate circuit of claim 15, wherein the multiply-and-accumulate circuit comprises part of a wireless communication device that includes a Generalized RAKE receiver circuit, and wherein the multiply-and-accumulate circuit is configured to perform the desired series of multiply-and-accumulate operations as part of a signal sample correlation process for combining weight generation.

30. The multiply-and-accumulate circuit of claim 15, wherein the multiply-and-accumulate circuit comprises part of a wireless communication device that includes a chip equalization filter circuit configured to carry out a filter coefficient estimation process as part of received signal equalization, and wherein the multiply-and-accumulate circuit comprises part of the chip equalization filter circuit and is configured to perform the desired series of multiply-and-accumulate operations for generating equalization filter coefficients.

31. The multiply-and-accumulate circuit of claim 15, wherein the desired series of multiply-and-accumulate operations are performed in one of a signal sample correlation estimation process, a signal convolution process, a signal correlation process, and a Finite Impulse Response filtering process.

32. The multiply-and-accumulate circuit of claim 15, wherein the multiply-and-accumulate circuit is configured to obtain at least some of the corresponding products from a look-up table that includes pre-computed products.

* * * * *

UNITED STATES PATENT AND TRADEMARK OFFICE
CERTIFICATE OF CORRECTION

PATENT NO. : 7,711,765 B2
APPLICATION NO. : 11/357816
DATED : May 4, 2010
INVENTOR(S) : Wang et al.

It is certified that error appears in the above-identified patent and that said Letters Patent is hereby corrected as shown below:

In Column 3, Line 60, delete "(-2-3)" and insert -- (-2·3) --, therefor.

In Column 3, Line 63, delete "2.6." and insert -- 2·6. --, therefor.

In Column 9, Line 20, delete "his" and insert -- h is --, therefor.

In Column 11, Lines 45-46, in Eq. (9), delete " $y_I^2(iK + d_1)y_Q^2(iK + d_1)$ " and insert -- $y_I^2(iK + d_1) + y_Q^2(iK + d_1)$ --, therefor.

In Column 12, Line 6, delete "2c(2);" and insert -- 2c(2)+c(2); --, therefor.

In Column 12, Line 24, delete "$r_{1,1}^1$," and insert -- $r_{1,1}^I$, --, therefor.

Signed and Sealed this

Sixth Day of July, 2010

David J. Kappos
*Director of the United States Patent and Trademark Office*